Patented Aug. 19, 1941

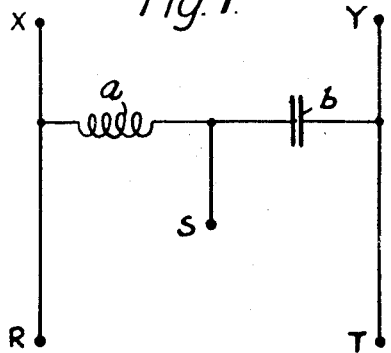
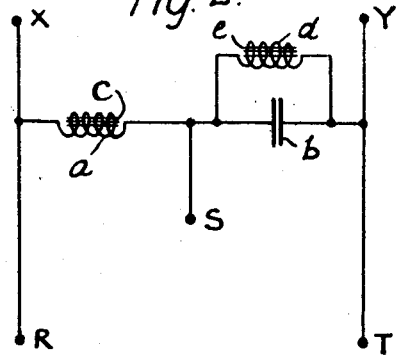
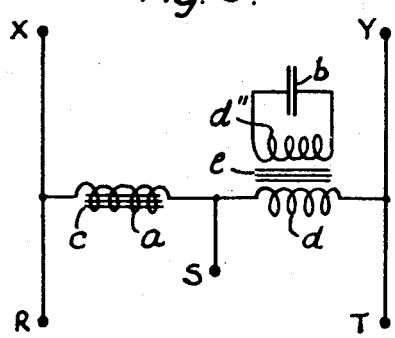
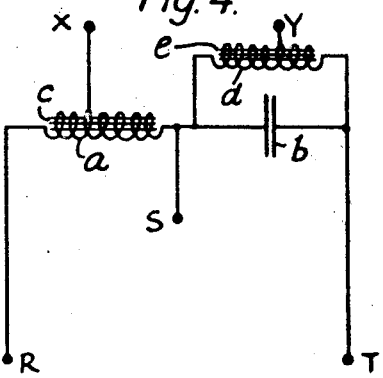
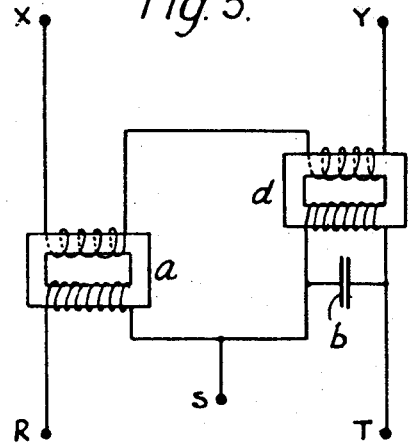
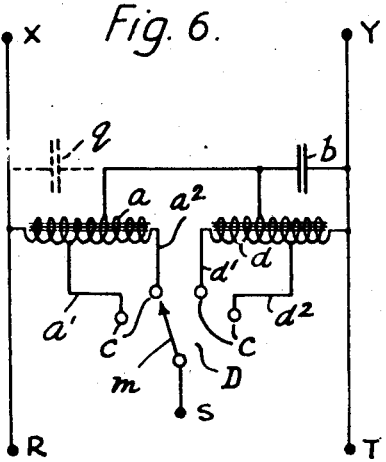

2,253,053

UNITED STATES PATENT OFFICE 2,253,053

CONVERSION OF SINGLE PHASE ALTERNATING ELECTRIC CURRENTS TO POLYPHASE CURRENTS

Sydney Arthur Stevens and Alec Hervey Bennett Walker, London, England, assignors, by mesne assignments, to The Union Switch & Signal Company, Swissvale, Pa., a corporation of Pennsylvania Application August 29, 1939, Serial No. 292,434
In Great Britain August 30, 1938

2 Claims. (Cl. 172—238)

This invention relates to the conversion of single phase alternating electric currents to polyphase currents and has for its object to provide improved arrangements for this purpose.

The invention is based upon the possibility of obtaining, from a single-phase alternating current source, a number of alternating currents displaced in phase from one another, by providing inductances and capacities so connected to the single phase source as to retard and advance respectively the phases of the voltages developed across these elements.

For example, by connecting a choke coil in series with a condenser across the terminals of a single phase alternating current supply circuit, a three phase load circuit can be connected to terminals constituted by the supply circuit terminals and the point of junction of the choke coil and the condenser. By suitably proportioning the reactive characteristics of the choke coil and the condenser, the voltages between the three terminals can be arranged to be equally displaced in phase by 120° for a particular value of load current.

This simple arrangement is, however, extremely unstable, the voltages displaced in phase impressed upon the load circuit being considerably varied both as regards phase relations and magnitude by any alteration in load while in the event of the load circuit becoming opened, the voltages across the terminals of the choke coil and condenser will tend to rise to dangerously high values resulting in the destruction of the coil or condenser.

This simple system of connection is thus quite unsuitable for variable loads owing to the instability and want of balance of the phase relations under change in load.

According to the present invention, these disadvantages are overcome by providing arrangements for automatically limiting and stabilising the voltage obtaining across each of the inductance and capacity elements. This action is preferably effected in the case of the inductance by providing its winding with a magnetic core which is designed to be magnetically saturated in a predetermined manner as the load on the polyphase load circuit varies, and in the case of the capacity by connecting a choke coil or its equivalent having a core adapted to be similarly magnetically saturated across the terminals of the capacity.

The polyphase voltages are thus rendered substantially limited in value and accordingly stabilised in spite of load variations, and variation in voltage due to change of load causing a variation in the magnetising currents absorbed by the saturated choke coils which tends to maintain the system in a balanced condition having the properly related phase relations.

The current supply for the terminals of the connection system above referred to by way of example is thus the equivalent of a three phase delta-connected supply which in the case of a uni-directional current load may, after rectification by traversing a usual rectifier arrangement, be transmitted to the load.

The voltage of the polyphase currents obtained according to the invention may evidently be arranged to have any desired value relative to that of the single phase supply circuit by providing the choke coils or inductances with a suitably designed winding or windings, so that the choke coils or inductances constitute two-coil or auto-transformers from which the load circuit is supplied.

The invention will now be described by way of example with reference to the accompanying drawings, of which:

Figure 1 is a circuit diagram illustrating the simple arrangement above referred to for conversion from single-phase to three-phase currents;

Figure 2 being a similar diagram embodying one form of the invention.

Figures 3, 4, 5 and 6, are diagrams similar to Figure 2 embodying other forms of the invention.

Figure 7 is a circuit diagram showing a different type of apparatus embodying the invention, Figure 8 illustrating a modification thereof while

Figure 7:
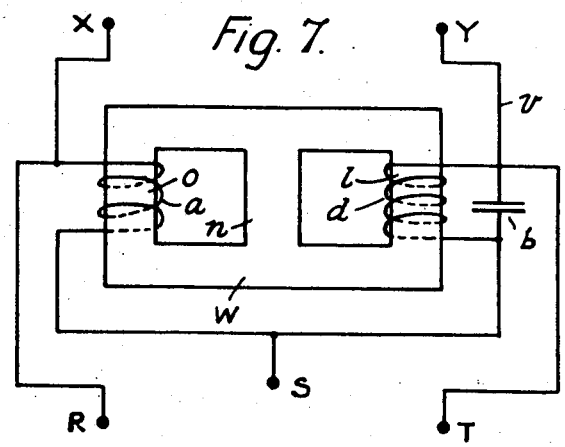

Referring now first to Figure 1, it will be seen that a choke coil $a$ is shown as connected in series with a condenser $b$ across the terminals X and Y of a single-phase alternating-current supply circuit. R, S, and T, are terminals to which a three phase load circuit can be connected, the terminals R and T being directly connected to the supply circuit terminals X and Y respectively, while the terminal S is connected to the point of junction of the choke coil $a$ and the condenser $b$. By suitably proportioning the reactive characteristics of the choke coil $a$ and the condenser $b$, the voltages being the three terminals R, S, and T, can be arranged to be equally displaced in phase by 120° for a particular value of the load current.

This simple arrangement is, however, as already explained, extremely unstable and therefore unsuitable for variable loads, the voltages impressed upon the load circuit being considerably varied both as regards phase relations and magnitude by any alteration in load, while in the event of the load circuit being opened the voltages across the terminals of the choke coil a and condenser b will tend to rise to dangerously high values resulting in the destruction of the coil or condenser.

These disadvantages are overcome by the invention and referring to the arrangement illustrated in Figure 2, it will be seen that the winding of the inductance a is provided with a magnetic core c which is designed to be magnetically saturated at an impressed voltage which is a little greater than the voltage developed across the winding under normal load conditions, a choke coil d having a core e adapted to be similarly magnetically saturated being connected across the terminals of the condenser b.

The voltages across the terminals R, S and S, T, respectively, are thus limited in value and stabilised in spite of load variations, since the magnetic flux determining the voltage across each of the windings a and d is substantially independent of variations in the magnetising currents due to change of load, the saturated coils a and d thus tending to maintain the system in a balanced condition and to maintain properly spaced phase relations.

The current supply for the terminals R, S, T, of the connection system is thus the equivalent of a three-phase delta-connected supply which may, after rectification by traversing a usual rectifier arrangement, be transmitted to a uni-directional current load.

In order to reduce the required capacity and thus the cost of the condenser employed, the condenser b may, as shown in Figure 3, be connected through a two-coil or auto-transformer in the well known manner, the core e of the choke coil d associated with the condenser b being provided with a secondary winding d'', from the terminals of which the condenser b is supplied with current at a suitably higher voltage than the voltage across the terminals of the choke coil d itself.

In order to enable the voltage of the polyphase currents obtained according to the invention to have any desired value relative to the voltage of the single phase supply circuit, the inductance a and the choke coil d may, as shown in Figure 4, be constructed as auto-transformers or, as shown in Figure 5, as two-coil transformers.

In some cases, it may be desirable to be able to adjust the effective values of the inductance a and the choke coil d in the connection system of Figure 2, and this can be readily effected by the arrangement shown in Figure 6 in which the windings of the elements a and d are provided with tapping connections $a^1$, $a^2$ and $d^1$, $d^2$ connected to the contact studs c of a rotary switch D, the movable contact arm m of which is connected to the three-phase terminal S. By suitably altering the setting of the switch D, the apparatus can evidently be adjusted for the range of load required.

Referring now to Figure 7, in this arrangement the windings of the inductance a and of the choke coil d are mounted on the outer limbs o, l, of a three limbed magnetic core W common to both windings. The middle limb n of the core W may evidently be of the same or different cross-sectional area as the other limbs o, l, the magnetic flux traversing the limb n being either the vectorial sum or difference of the fluxes traversing the limbs o and l according to the relative connection or direction of winding of the inductance and choke coil windings.

Figure 8:
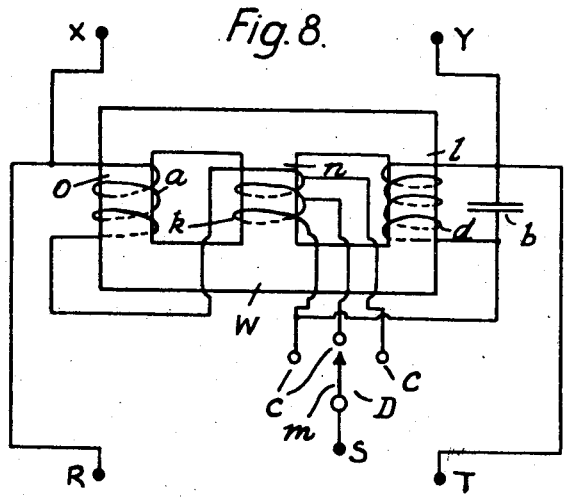

A somewhat similar arrangement is shown in Figure 8, in which the middle limb n is provided with a winding k connected in series with the windings of the inductance a and the choke coil d.

In order to obtain adjustment as explained in connection with the arrangement of Figure 6, the winding k is provided with tapping connections leading to contact studs c on a rotary switch D as will be evident from Figure 8 without further explanation.

Similar adjustment arrangements to those shown in Figure 6 may evidently also be provided for the system shown in Figure 7, if desired, and in a still further modification of Figure 7 the conductor v leading to the Y terminal may be connected in series with a coil wound in one direction or the other on the middle limb n of the core W.

In some cases it is found to be of advantage to provide a small condenser connected in parallel with the inductance a, as indicated for example in dotted lines at q in Figure 6, for the purpose of neutralising the rising portions of the magnetic saturation curve of the core associated with the winding of the inductance a.

Figure 9:
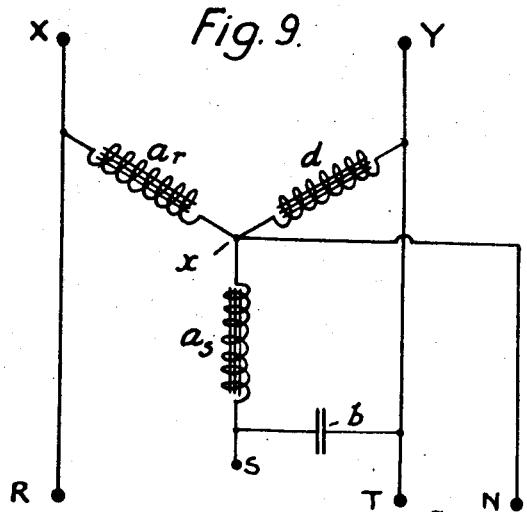
Figure 9 is a circuit diagram illustrating a still further form of apparatus embodying the invention.

Referring now to the arrangement shown in Figure 9, the inductance a shown in the preceding figures comprises two equal sections $a_r$ and $a_s$ which form a star connection with the choke coil d as shown in the drawings, the point of connection x of the elements $a_r$, $a_s$ and d being connected to a neutral terminal N.

Other systems of connection involving various arrangements of the inductance, condenser and choke coil comprising the essential elements of the invention may also be utilised, as will be apparent to those skilled in the art.

The electrical and magnetic characteristics of the inductances nad choke coils employed must evidently be determined in accordance with the conditions to be met and in these and other respects the invention is not limited to the examples herein described or any particular form or construction of apparatus. For example, the choke coil d may be constructed as a two-coil transformer, as shown in Figure 5, with an additional secondary winding for the condenser b thus combining the arrangements above described with reference to Figures 3 and 5 respectively, or an auto-transformer arrangement may be utilised in a manner which will be evident.

Having now particularly described and ascertained the nature of our said invention and in what manner the same is to be performed, we declare that what we claim is:

1. Apparatus for the conversion of single phase alternating electric currents to polyphase currents of the kind described, comprising an inductance and a capacity connected in series across the single phase source, the connection between said inductance and capacity serving as a polyphase terminal of the apparatus, a choke coil connected in parallel with the capacity, and a common magnetic core having at least three limbs on one of which is wound said inductance and on another of which is wound said choke coil, said core being designed to be magnetically saturated in a predetermined manner as the load on the polyphase circuit varies.

2. Apparatus for the conversion of single phase alternating electric currents to polyphase currents of the kind described, comprising an inductance and a capacity connected in series across the single phase source, the connection between said inductance and capacity serving as a polyphase terminal of the apparatus, a choke coil connected in parallel with the capacity, a common magnetic core having at least three limbs on one of which is wound said inductance and on another of which is wound said choke coil, said core being designed to be magnetically saturated in a predetermined manner as the load on the polyphase circuit varies, and a saturation control winding connected in circuit with the load and wound on a third limb of said common magnetic core.

SYDNEY ARTHUR STEVENS.
ALEC HERVEY BENNETT WALKER.